United States Patent
Grevious et al.

(10) Patent No.: US 9,206,594 B1
(45) Date of Patent: Dec. 8, 2015

(54) HANGER WITH LOCATOR TOOTH

(71) Applicant: Columbia Insurance Company, Omaha, NE (US)

(72) Inventors: Todd Grevious, Faribault, MN (US); Steve Brekke, Lakeville, MN (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 14/476,938

(22) Filed: Sep. 4, 2014

(51) Int. Cl.
  *E04B 1/38* (2006.01)
  *E04B 1/26* (2006.01)
  *F16B 7/04* (2006.01)

(52) U.S. Cl.
  CPC .............. *E04B 1/2612* (2013.01); *F16B 7/0446* (2013.01)

(58) Field of Classification Search
  CPC ....... E04B 1/2612; E04B 1/2608; E04B 5/12; E04B 2001/2415; E04B 1/2604
  USPC ................................... 52/700, 702, 704, 708
  See application file for complete search history.

(56) References Cited

U.S. PATENT DOCUMENTS

| | | |
|---|---|---|
| 332,188 A | 12/1885 | Cridge et al. |
| 414,169 A | 10/1889 | Reuschel |
| 426,552 A | 4/1890 | Smead |
| 456,553 A | 7/1891 | Carr |
| 478,163 A | 7/1892 | Lehman |
| 508,280 A | 11/1893 | Cavallaro |
| 526,302 A | 9/1894 | Drake |
| 533,557 A | 2/1895 | Rieseck |
| 533,659 A | 2/1895 | Meyenberg |
| 537,505 A | 4/1895 | Van Dorn |
| 546,147 A * | 9/1895 | Gregg ........................ 403/232.1 |
| D25,397 S | 4/1896 | Stark |
| 591,405 A | 10/1897 | Jenkins |
| 610,832 A | 9/1898 | Robinson |
| 611,366 A | 9/1898 | Lund |
| 625,427 A | 5/1899 | Stewart et al. |
| 666,918 A | 1/1901 | Butz |

(Continued)

FOREIGN PATENT DOCUMENTS

| | | |
|---|---|---|
| CA | 862969 A | 2/1971 |
| CA | 1102087 A | 6/1981 |

(Continued)

OTHER PUBLICATIONS

United Steel Products Company, Inc.'s Lumber Connectors Catalog (Partial Catalog)—Construction Hardware (1996), 6 pages.

(Continued)

*Primary Examiner* — Brian Glessner
*Assistant Examiner* — Adam Barlow
(74) *Attorney, Agent, or Firm* — Senniger Powers LLP

(57) ABSTRACT

A hanger for connecting a structural member to a structural support includes a base sized and shaped for receiving the structural member thereon. First and second side panels extend upward from the base, and first and second back panels extend from a respective one of the side panels. First and second top flanges extend from a respective one of the back panels, each of the top flanges having a free end opposite the back panel. The free end has free corner margins, at least one corner margin of at least one top flange depending downward from an adjacent portion of the top flange to form a locator tooth configured to penetrate the structural support for at least temporarily locating the hanger on the structural support.

20 Claims, 11 Drawing Sheets

(56) References Cited

U.S. PATENT DOCUMENTS

| | | | |
|---|---|---|---|
| 716,898 A | 12/1902 | Hutchings |
| 741,066 A | 10/1903 | O'Shea |
| 753,053 A | 2/1904 | Eberhardt |
| 753,467 A | 3/1904 | Bordner |
| 755,116 A | 3/1904 | Dreyer |
| 765,009 A | 7/1904 | Hinchman |
| 770,050 A | 9/1904 | Dreyer |
| 783,807 A | 2/1905 | Tuteur |
| 796,433 A | 8/1905 | Kahn |
| 804,451 A | 11/1905 | Carlson |
| 828,488 A | 8/1906 | Lanz |
| 829,234 A | 8/1906 | Seipp |
| 832,133 A | 10/1906 | Lanz |
| 836,310 A | 11/1906 | Ferguson |
| 841,777 A | 1/1907 | Hamilton et al. |
| 858,838 A | 7/1907 | Tuteur |
| 862,498 A | 8/1907 | Mohan |
| 874,514 A | 12/1907 | Lindow |
| 915,421 A | 3/1909 | Eisen |
| 922,215 A | 5/1909 | Tuteur |
| 924,842 A | 6/1909 | Seipp |
| 955,338 A | 4/1910 | Leiter |
| 956,347 A | 4/1910 | Heller |
| 969,289 A | 9/1910 | Kosack |
| 991,573 A | 5/1911 | Wells |
| 1,007,759 A | 11/1911 | Whitney |
| 1,033,252 A | 7/1912 | Kingston |
| 1,077,839 A | 11/1913 | Kingston |
| 1,097,934 A | 5/1914 | Price |
| 1,122,470 A | 12/1914 | Brussel |
| 1,136,817 A | 4/1915 | Ladd |
| 1,146,251 A | 7/1915 | Harp |
| 1,231,433 A | 6/1917 | Ryan |
| 1,235,636 A | 8/1917 | Bagnall et al. |
| 1,260,531 A | 3/1918 | Fiala, Jr. |
| 1,385,765 A | 7/1921 | Wells |
| 1,406,723 A * | 2/1922 | Caldwell ................ 403/232.1 |
| 1,423,481 A | 7/1922 | Hall |
| 1,472,601 A | 10/1923 | Lally |
| 1,474,660 A | 11/1923 | White |
| 1,516,971 A | 11/1924 | Kingston |
| 1,538,218 A | 5/1925 | Seelye |
| 1,568,155 A | 1/1926 | Heath |
| 1,589,528 A | 6/1926 | Hayes |
| 1,610,013 A | 12/1926 | Kingston |
| 1,623,892 A | 4/1927 | Sobray |
| 1,639,930 A | 8/1927 | Davidson |
| 1,692,351 A | 11/1928 | Ropp |
| 1,695,909 A | 12/1928 | Bauer |
| 1,698,508 A | 1/1929 | Pimm |
| 1,720,104 A | 7/1929 | Taylor et al. |
| 1,728,981 A | 9/1929 | Ropp |
| 1,729,935 A | 10/1929 | Froehlich |
| 1,733,764 A | 10/1929 | White |
| 1,765,107 A | 6/1930 | Snyder |
| 1,767,333 A | 6/1930 | Welt |
| 1,785,648 A | 12/1930 | Rice |
| 1,785,790 A | 12/1930 | Ropp |
| 1,785,791 A | 12/1930 | Ropp |
| 1,792,815 A | 2/1931 | Chapin |
| 1,806,607 A | 5/1931 | Brown |
| 1,807,405 A | 5/1931 | Heitmann |
| 1,836,573 A | 12/1931 | Brogden |
| 1,848,497 A | 3/1932 | Shook |
| 1,854,645 A | 4/1932 | Crysler et al. |
| 1,872,813 A | 8/1932 | Reiland |
| 1,928,748 A | 10/1933 | Young |
| 1,929,835 A | 10/1933 | Awbrey |
| 1,933,536 A | 11/1933 | Awbrey |
| 2,015,951 A | 10/1935 | McAtee |
| 2,064,984 A | 12/1936 | Marsh |
| 2,073,795 A | 3/1937 | Haugaard |
| 2,079,478 A | 5/1937 | Bashe |
| 2,081,380 A | 5/1937 | Nachreiner |
| 2,103,010 A | 12/1937 | Kohnke |
| 2,106,084 A | 1/1938 | Coddington |
| 2,110,863 A | 3/1938 | Barnett |
| 2,115,625 A | 4/1938 | Fleshman |
| 2,137,009 A | 11/1938 | Stromberg |
| 2,163,446 A | 6/1939 | Heckman |
| 2,212,184 A | 8/1940 | Powell |
| 2,261,437 A | 11/1941 | Galbraith |
| 2,302,920 A | 11/1942 | Sobie |
| 2,495,408 A | 1/1950 | Christoffersen |
| 2,500,636 A | 3/1950 | Isakson |
| D160,928 S | 11/1950 | D'Aleo |
| 2,700,457 A | 1/1955 | Munroe |
| 2,704,868 A | 3/1955 | Danielson |
| 2,726,866 A | 12/1955 | Nally |
| 2,809,405 A | 10/1957 | McElwee |
| 2,815,546 A | 12/1957 | Kenk |
| 2,871,542 A | 2/1959 | Bergdal |
| 2,913,210 A | 11/1959 | Tichnor |
| 2,990,590 A | 7/1961 | Graveley |
| 2,994,415 A | 8/1961 | Halle |
| 3,000,145 A | 9/1961 | Fine |
| 3,036,347 A * | 5/1962 | Findleton ................ 403/217 |
| 3,091,822 A | 6/1963 | Fiekers et al. |
| 3,137,922 A | 6/1964 | Schumacher |
| 3,172,238 A | 3/1965 | Sandin |
| 3,196,996 A | 7/1965 | Rambelje |
| 3,207,357 A | 9/1965 | Schmitt |
| 3,222,831 A | 12/1965 | Pritchard |
| 3,274,742 A | 9/1966 | Paul, Jr. et al. |
| 3,300,926 A | 1/1967 | Heirich |
| 3,332,188 A | 7/1967 | Schaefer |
| 3,342,005 A | 9/1967 | Rickards et al. |
| 3,365,222 A | 1/1968 | Polyak |
| 3,392,409 A | 7/1968 | Politz |
| 3,394,519 A | 7/1968 | Tischuk |
| 3,416,282 A | 12/1968 | Daugherty |
| 3,420,560 A | 1/1969 | Pfahning |
| 3,422,585 A | 1/1969 | Dismukes |
| 3,423,898 A | 1/1969 | Tracy et al. |
| 3,432,085 A | 3/1969 | Lock |
| 3,470,665 A | 10/1969 | Perrault |
| 3,537,221 A | 11/1970 | Helfman et al. |
| 3,601,428 A | 8/1971 | Gilb |
| 3,623,755 A | 11/1971 | Ratliff, Jr. |
| 3,633,950 A | 1/1972 | Gilb |
| D224,083 S | 7/1972 | Gilb |
| 3,673,664 A | 7/1972 | Niese |
| 3,703,304 A | 11/1972 | Losee |
| 3,715,850 A | 2/1973 | Chambers |
| 3,752,512 A | 8/1973 | Gilb |
| 3,813,834 A | 6/1974 | Davis, Jr. |
| 3,828,514 A | 8/1974 | Jureit |
| 3,837,135 A | 9/1974 | Zachman |
| 3,853,294 A | 12/1974 | Albinson et al. |
| 3,892,315 A | 7/1975 | Johnson |
| 3,907,445 A | 9/1975 | Wendt |
| 3,919,824 A | 11/1975 | Davis, Jr. |
| 3,945,741 A * | 3/1976 | Wendt ................ 403/191 |
| 3,946,532 A | 3/1976 | Gilb |
| 3,954,248 A | 5/1976 | Barber |
| 3,967,908 A | 7/1976 | Snow et al. |
| 3,972,169 A | 8/1976 | Sheppard, Jr. |
| 4,003,179 A | 1/1977 | Gilb |
| 4,005,942 A | 2/1977 | Gilb |
| 4,041,664 A | 8/1977 | Davis, Jr. |
| 4,074,495 A | 2/1978 | Bodnar |
| D248,275 S | 6/1978 | Gilb |
| 4,096,670 A | 6/1978 | Fuller |
| 4,124,962 A | 11/1978 | Lancelot, III et al. |
| 4,158,940 A | 6/1979 | Lancelot, III et al. |
| 4,192,623 A | 3/1980 | Borg |
| 4,198,175 A | 4/1980 | Knepp et al. |
| 4,218,856 A | 8/1980 | Irwin |
| D256,663 S | 9/1980 | Gilb |
| 4,223,866 A | 9/1980 | Black |
| 4,230,416 A | 10/1980 | Gilb |
| 4,261,155 A | 4/1981 | Gilb |
| 4,264,063 A | 4/1981 | Halula |
| D260,964 S | 9/1981 | Gilb |

(56) References Cited

U.S. PATENT DOCUMENTS

| | | | |
|---|---|---|---|
| 4,291,996 | A | 9/1981 | Gilb |
| 4,330,971 | A | 5/1982 | Auberger |
| 4,340,100 | A | 7/1982 | Anderson, II |
| 4,343,580 | A | 8/1982 | Moyer et al. |
| 4,353,664 | A | 10/1982 | Gilb |
| 4,367,973 | A | 1/1983 | Gilb et al. |
| 4,408,262 | A | 10/1983 | Kusmer |
| 4,411,548 | A | 10/1983 | Tschan |
| 4,417,431 | A | 11/1983 | Commins et al. |
| 4,422,792 | A | 12/1983 | Gilb |
| 4,423,977 | A | 1/1984 | Gilb |
| 4,480,941 | A * | 11/1984 | Gilb et al. .............. 403/232.1 |
| 4,523,412 | A | 6/1985 | Sielaff |
| 4,523,413 | A | 6/1985 | Koppenberg |
| 4,525,972 | A | 7/1985 | Palacio et al. |
| 4,531,334 | A | 7/1985 | Nylander et al. |
| 4,560,301 | A | 12/1985 | Gilb |
| 4,569,451 | A | 2/1986 | Parrott et al. |
| 4,572,695 | A | 2/1986 | Gilb |
| 4,576,280 | A | 3/1986 | Dove et al. |
| 4,594,017 | A | 6/1986 | Hills |
| 4,607,472 | A | 8/1986 | Pointner |
| 4,696,137 | A | 9/1987 | Schleich |
| 4,709,460 | A | 12/1987 | Luhowyj |
| 4,717,279 | A | 1/1988 | Commins |
| 4,739,602 | A | 4/1988 | Fricker |
| 4,744,191 | A | 5/1988 | Fricker |
| 4,753,014 | A | 6/1988 | Vrajich |
| 4,802,786 | A | 2/1989 | Yauger et al. |
| 4,854,096 | A | 8/1989 | Smolik |
| 4,856,252 | A | 8/1989 | Cornell |
| 4,893,961 | A | 1/1990 | O'Sullivan et al. |
| 4,894,964 | A | 1/1990 | Thrift et al. |
| 4,920,725 | A | 5/1990 | Gore |
| 4,932,173 | A | 6/1990 | Commins |
| 4,947,616 | A | 8/1990 | Sorton |
| 4,964,253 | A | 10/1990 | Loeffler |
| 4,965,980 | A | 10/1990 | Leavens |
| 4,982,548 | A | 1/1991 | Abbey |
| 4,995,206 | A | 2/1991 | Colonias et al. |
| 4,997,172 | A | 3/1991 | Mumm et al. |
| 5,004,369 | A | 4/1991 | Young |
| 5,042,217 | A | 8/1991 | Bugbee et al. |
| 5,058,358 | A | 10/1991 | Stratton |
| 5,071,280 | A | 12/1991 | Turner |
| 5,092,096 | A | 3/1992 | Cornell |
| 5,104,252 | A | 4/1992 | Colonias et al. |
| 5,111,632 | A | 5/1992 | Turner |
| 5,192,056 | A | 3/1993 | Espinueva |
| 5,192,059 | A | 3/1993 | Silver |
| 5,203,132 | A | 4/1993 | Smolik |
| 5,217,317 | A | 6/1993 | Young |
| 5,220,766 | A | 6/1993 | Hills, Sr. |
| 5,228,261 | A | 7/1993 | Watkins |
| 5,236,273 | A | 8/1993 | Gilb |
| 5,240,342 | A | 8/1993 | Kresa, Jr. |
| 5,249,404 | A | 10/1993 | Leek et al. |
| 5,295,754 | A | 3/1994 | Kato |
| 5,297,886 | A | 3/1994 | Jansen et al. |
| 5,324,132 | A | 6/1994 | Hunter et al. |
| 5,341,619 | A | 8/1994 | Dunagan et al. |
| 5,367,853 | A | 11/1994 | Bryan |
| 5,383,320 | A | 1/1995 | Sorton |
| 5,385,433 | A | 1/1995 | Calandra, Jr. et al. |
| 5,394,665 | A | 3/1995 | Johnson |
| 5,394,668 | A | 3/1995 | Lim |
| 5,403,110 | A | 4/1995 | Sammann |
| 5,438,811 | A | 8/1995 | Goya |
| 5,457,928 | A | 10/1995 | Sahnazarian |
| D364,331 | S | 11/1995 | Leek |
| 5,481,844 | A | 1/1996 | Kajita |
| 5,497,593 | A | 3/1996 | Riesberg |
| 5,524,397 | A | 6/1996 | Byers et al. |
| 5,528,875 | A | 6/1996 | Ziegler, Jr. et al. |
| 5,555,694 | A | 9/1996 | Commins |
| 5,560,156 | A | 10/1996 | McDonald |
| 5,564,248 | A | 10/1996 | Callies |
| 5,577,856 | A | 11/1996 | Tezuka |
| 5,603,580 | A | 2/1997 | Leek et al. |
| 5,620,275 | A | 4/1997 | Novacek |
| 5,625,995 | A | 5/1997 | Martin |
| 5,636,819 | A | 6/1997 | Kettlestrings |
| 5,694,732 | A | 12/1997 | Wilbert |
| 5,775,048 | A | 7/1998 | Orchard |
| 5,797,694 | A | 8/1998 | Breivik |
| 5,806,274 | A | 9/1998 | Wurtz et al. |
| 5,819,196 | A | 10/1998 | Holmes et al. |
| 5,836,131 | A | 11/1998 | Viola et al. |
| 5,845,453 | A | 12/1998 | Goya |
| 5,896,721 | A | 4/1999 | Sugiyama |
| D409,078 | S | 5/1999 | Bolt |
| 5,921,049 | A | 7/1999 | Sugiyama |
| 5,930,968 | A | 8/1999 | Pullam |
| 5,938,366 | A | 8/1999 | Novacek |
| 5,941,044 | A | 8/1999 | Sera |
| 5,979,130 | A | 11/1999 | Gregg et al. |
| 6,006,925 | A | 12/1999 | Sevier |
| 6,012,262 | A | 1/2000 | Irving |
| 6,088,982 | A | 7/2000 | Hiesberger |
| 6,088,989 | A | 7/2000 | Matsu et al. |
| 6,094,880 | A | 8/2000 | Thompson |
| 6,112,495 | A | 9/2000 | Gregg et al. |
| 6,126,156 | A | 10/2000 | Brodeur |
| 6,131,358 | A | 10/2000 | Wise |
| 6,148,574 | A | 11/2000 | Chapman |
| 6,209,826 | B1 | 4/2001 | Pratt, Jr. |
| 6,230,466 | B1 | 5/2001 | Pryor |
| 6,230,467 | B1 | 5/2001 | Leek |
| 6,250,041 | B1 | 6/2001 | Seccombe |
| 6,260,402 | B1 | 7/2001 | Leek |
| 6,295,780 | B1 | 10/2001 | Thompson |
| 6,295,781 | B1 | 10/2001 | Thompson |
| 6,301,854 | B1 | 10/2001 | Daudet et al. |
| 6,301,855 | B1 | 10/2001 | Aerni |
| 6,327,830 | B1 | 12/2001 | Hecht et al. |
| 6,334,285 | B1 | 1/2002 | Kirschner |
| 6,367,224 | B1 | 4/2002 | Leek |
| 6,397,552 | B1 | 6/2002 | Bourque |
| 6,418,694 | B1 | 7/2002 | Daudet et al. |
| 6,463,710 | B1 | 10/2002 | Barnhart |
| 6,463,711 | B1 | 10/2002 | Callies |
| 6,508,447 | B1 | 1/2003 | Catani et al. |
| 6,523,321 | B1 | 2/2003 | Leek et al. |
| 6,527,351 | B1 | 3/2003 | Sevier et al. |
| 6,607,086 | B1 | 8/2003 | Gretz |
| 6,691,478 | B2 | 2/2004 | Daudet et al. |
| 6,761,005 | B1 | 7/2004 | Daudet et al. |
| 6,877,291 | B2 * | 4/2005 | Shamroukh et al. .......... 52/702 |
| 7,024,833 | B1 | 4/2006 | Rice |
| 7,334,372 | B2 * | 2/2008 | Evans et al. .................. 52/289 |
| 7,448,178 | B2 | 11/2008 | Visone |
| 7,451,575 | B2 | 11/2008 | Hall et al. |
| 8,250,827 | B2 | 8/2012 | Lin et al. |
| 8,387,333 | B2 * | 3/2013 | Brekke ....................... 52/702 |
| 8,720,155 | B1 * | 5/2014 | Robell ........................ 52/702 |
| 2003/0009980 | A1 * | 1/2003 | Shahnazarian ............... 52/712 |
| 2003/0159393 | A1 | 8/2003 | Piscione et al. |
| 2004/0129845 | A1 * | 7/2004 | Whale et al. ................ 248/201 |
| 2007/0294979 | A1 * | 12/2007 | Lin et al. .................... 52/702 |
| 2008/0101855 | A1 * | 5/2008 | Lin ........................ 403/232.1 |

FOREIGN PATENT DOCUMENTS

| | | | |
|---|---|---|---|
| CA | 2021903 | A1 | 1/1992 |
| CH | 105169 | | 6/1924 |
| DE | 830832 | | 2/1952 |
| DE | 29610381 | U1 | 10/1996 |
| DE | 19548334 | A1 | 6/1997 |
| EP | 0 210 744 | A1 | 2/1987 |
| EP | 0 745 735 | A1 | 12/1996 |
| FR | 1007078 | | 4/1952 |
| FR | 2650611 | A1 | 2/1991 |
| GB | 435226 | | 9/1935 |
| GB | 776350 | | 6/1957 |

(56) References Cited

FOREIGN PATENT DOCUMENTS

| | | |
|---|---|---|
| GB | 1431122 | 4/1976 |
| GB | 2156398 A | 10/1985 |
| GB | 2163788 A | 3/1986 |
| GB | 2176222 A | 12/1986 |
| GB | 2219323 A | 12/1989 |
| GB | 2252338 A | 8/1992 |
| GB | 2316103 A | 2/1998 |
| GB | 2354267 A | 3/2001 |
| JP | 06136872 A | 5/1994 |
| WO | 90/10765 | 9/1990 |
| WO | 01/06068 A1 | 1/2001 |

OTHER PUBLICATIONS

United Steel Products Company, Inc.'s Lumber Connectors Catalog (Partial Catalog) (1998), 4 pages.

\* cited by examiner

HANGER WITH LOCATOR TOOTH

FIELD OF THE INVENTION

The present invention generally relates to connections for structures, and more specifically, a joist hanger for connecting a joist to a header.

BACKGROUND

The use of hangers to attach structural members (e.g., joists) to structural supports (e.g., headers) is commonplace. When constructing a structure, users must install many hangers to attach the joists to the headers throughout the building. Typically, a user must align a hanger in the desired position and hold it there while fasteners are inserted to mount the hanger on the header. However, this process can be unwieldy and time consuming, especially when repeated many times over throughout the construction of the structure. In addition, the hanger might move from the desired location while a user is manipulating the fasteners, thereby resulting in a misaligned hanger. Furthermore, when trying to align the hanger and hold it in place for fastening, a user must often overcome a bias of the hanger to flex outwardly as a result of how the hanger was packaged for shipping.

SUMMARY

In one aspect, a hanger for connecting a structural member to a structural support includes a base sized and shaped for receiving the structural member thereon. First and second side panels extend upward from the base. First and second back panels extend from a respective one of the side panels. First and second top flanges extend from a respective one of the back panels. Each of the top flanges has a free end opposite the back panel. The free end has free corner margins, at least one corner margin of at least one top flange depending downward from an adjacent portion of the top flange to form a locator tooth configured to penetrate the structural support for at least temporarily locating the hanger on the structural support.

In another aspect, a hanger for connecting a structural member to a structural support includes a base sized and shaped for receiving the structural member thereon. First and second side panels extend upward from the base, each of the side panels having nail teeth struck therefrom configured to engage the structural member. First and second back panels extend from a respective one of the side panels and include a major surface arranged to engage the structural support. Each back panel has fastening structure configured to permit attachment of the back panel to the structural support. First and second top flanges extend from a respective one of the back panels, each of the top flanges having a free end opposite the back panel. The free end has free corner margins, and at least one corner margin of each top flange is bent downward from an adjacent portion of the top flange to form a locator tooth configured to penetrate the structural support for at least temporarily locating the hanger on the structural support.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
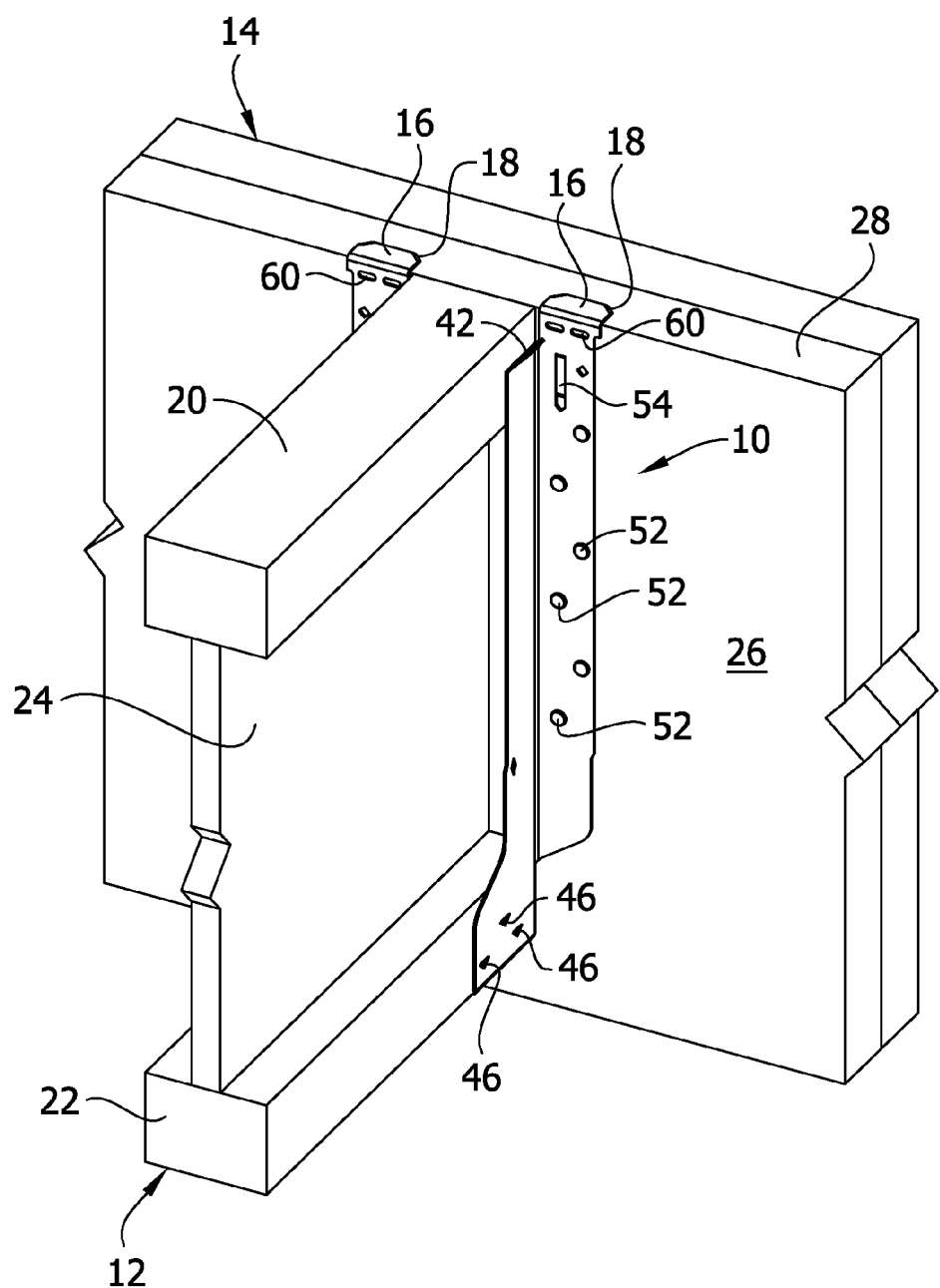
FIG. 1 is a fragmentary perspective of an I-joist connected to a header by a hanger according to the present invention.
Figure 2:
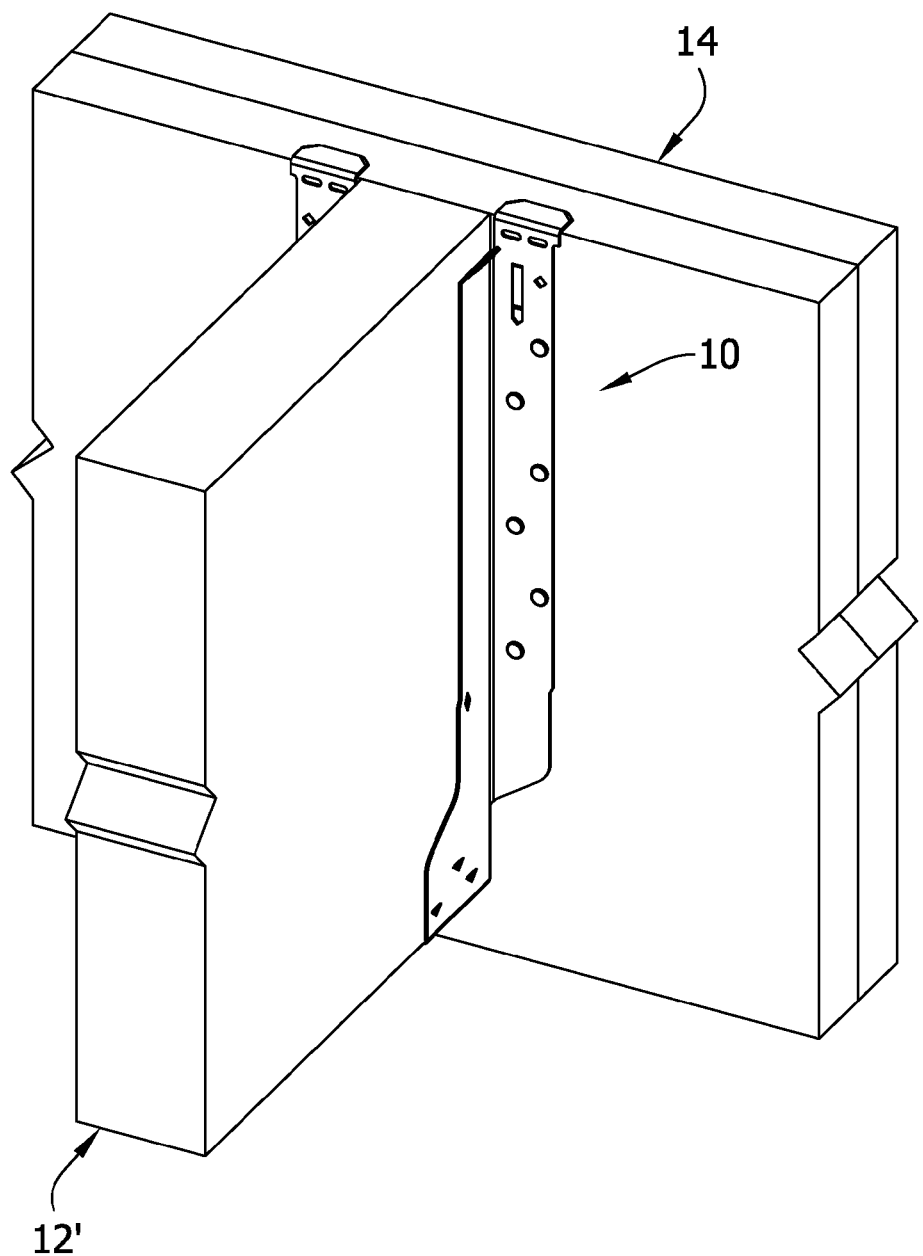
FIG. 2 is a fragmentary perspective of a full lumber joist connected to a header by a hanger according to the present invention.

Referring to FIG. 1, a hanger for a wooden structural member (e.g., a joist) is shown generally at 10. The hanger 10 is configured to connect a joist 12 to a structural support such as header 14, and includes top flanges 16 with locator teeth 18 configured to assist a user in at least temporarily locating the hanger on the header. In the illustrated embodiment, the joist 12 is an I-joist having a top chord 20, a bottom chord 22, and a web 24 extending between the top and bottom chords. The header 14 is formed by two pieces of lumber and has a front face 26 and a top surface 28. The joist 12 is mounted on the header 14 adjacent the front face 26 by the hanger 10. However, the hanger 10 can be used to mount other wooden structural members, such as full dimension lumber joists 12' (see, e.g., FIG. 2), or to connect structural components other than joists and headers. The following description will refer to the joist 12, but it will be understood that it also applies when the full dimension lumber joist 12' is used.

Referring to FIGS. 3-10, the hanger 10 includes a seat or base 32 and a pair of side panels 34 extending upward from the base. When installed, the base 32 is generally horizontal, and the side panels 34 extend generally vertical from the base. The base 32 and side panels 34 form a channel 36 configured to receive the joist 12. The side panels 34 include inner major surfaces that face toward the joist 12 when received in the hanger 10. A back panel 38 extends from each of the side panels 34. Each back panel 38 is generally perpendicular to both the side panels 34 and the base 32. When installed, each back panel 38 has a major surface extending generally parallel to the front face 26 of the header 14 for flush engagement with the front face. A top flange 16 extends from each of the back panels 38. Each top flange 16 is generally perpendicular to the back panels 38 and generally parallel to the base 32. The features and construction of the top flanges 16 are described in further detail below. The hanger 10 can include a stiffener tab 40 extending upward from a rear edge margin of the base 32. The stiffener tab 40 stiffens the base 32 to provide additional structural rigidity to the hanger 10. The tab 40 can also provide additional flush engagement with the header 14 and locate the joist 12 in the hanger 10. The hanger can also include guide tabs 42 positioned at the top of each side panel 34. The guide tabs 42 flare outwardly (e.g., at about 45°) to form a funnel to guide the joist 12 into the channel 36.

Figure 3:
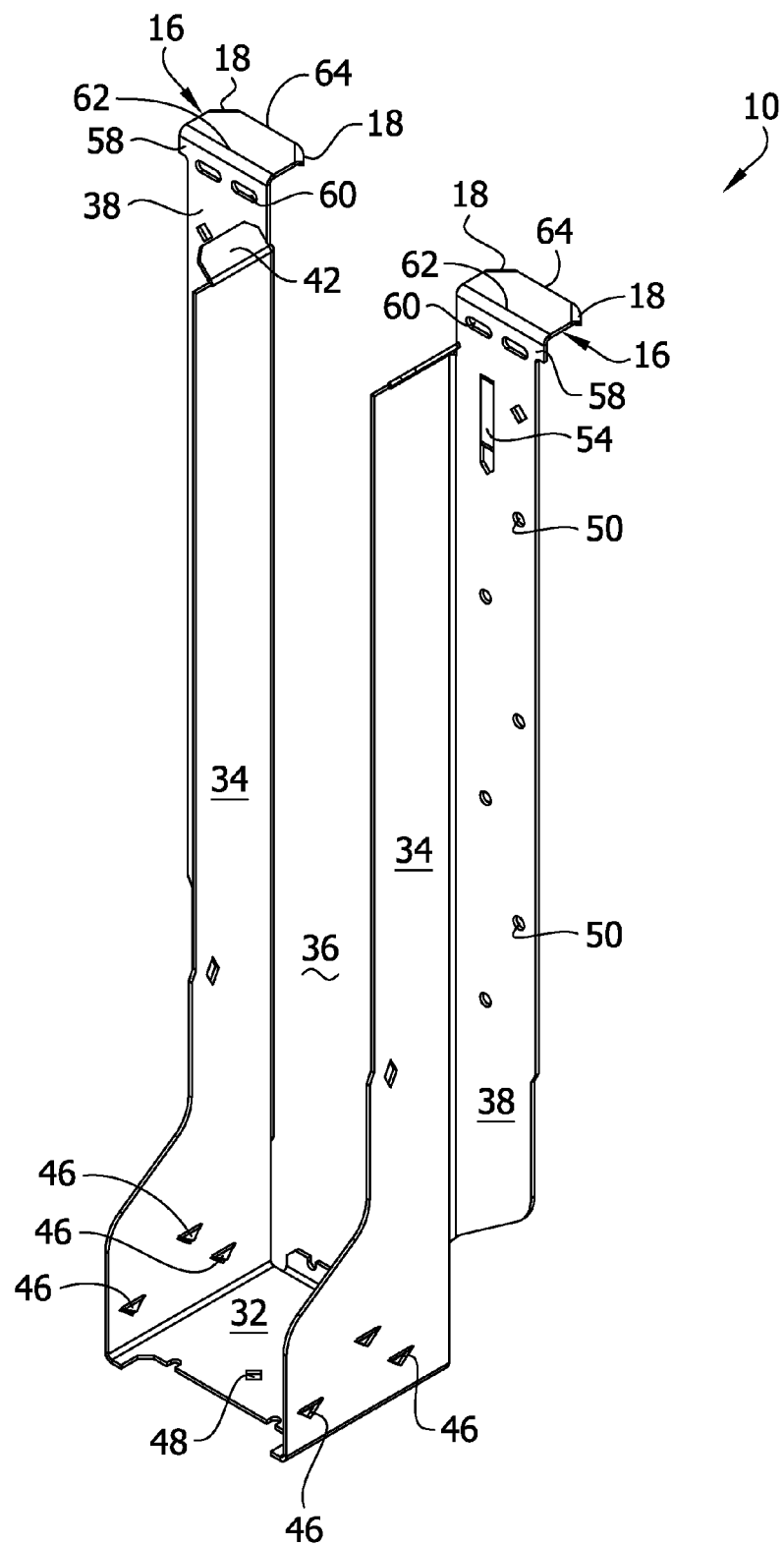
FIG. 3 is a perspective of a hanger according to the present invention.
Figure 4:
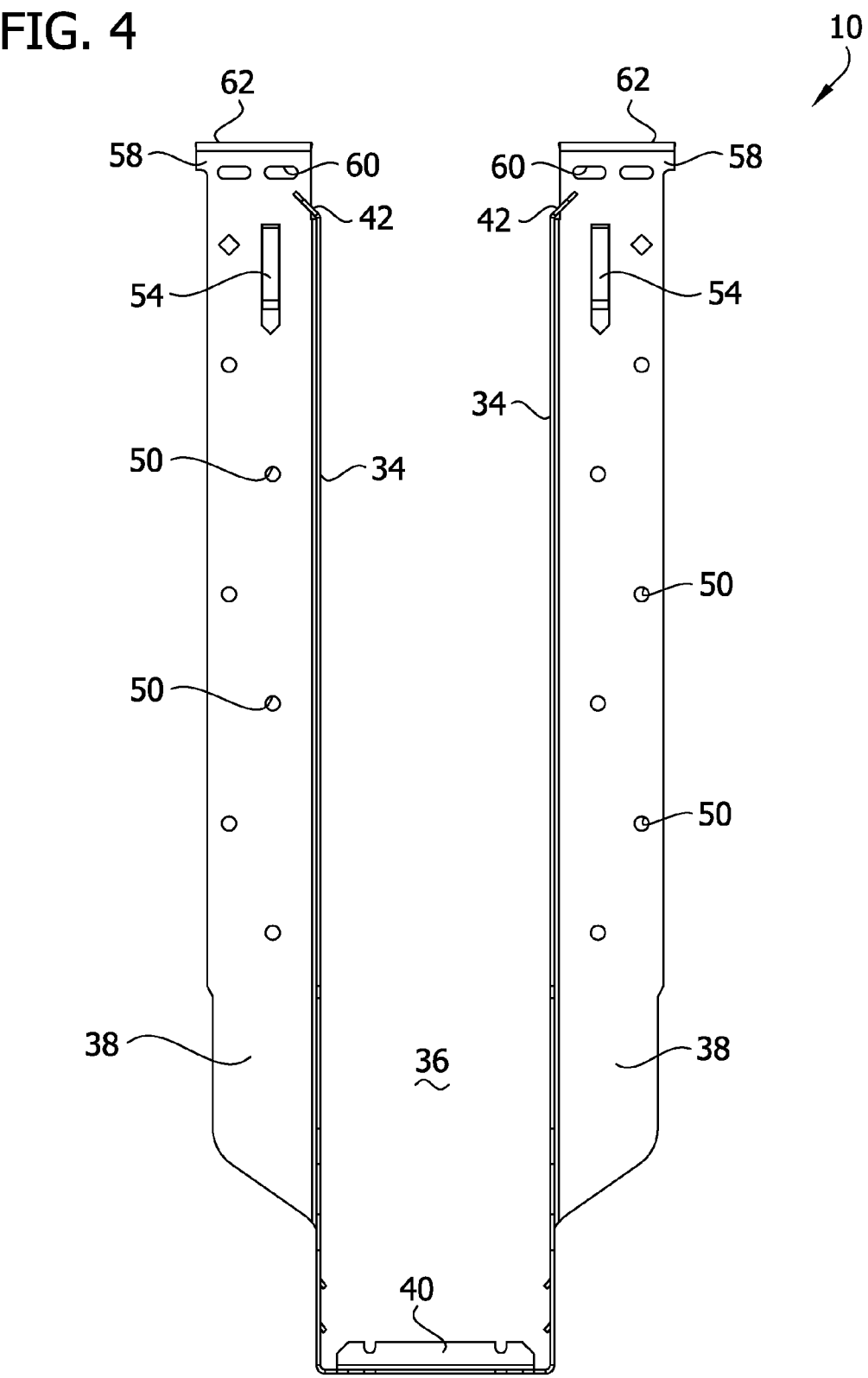
FIG. 4 is a front elevation thereof.
Figure 5:
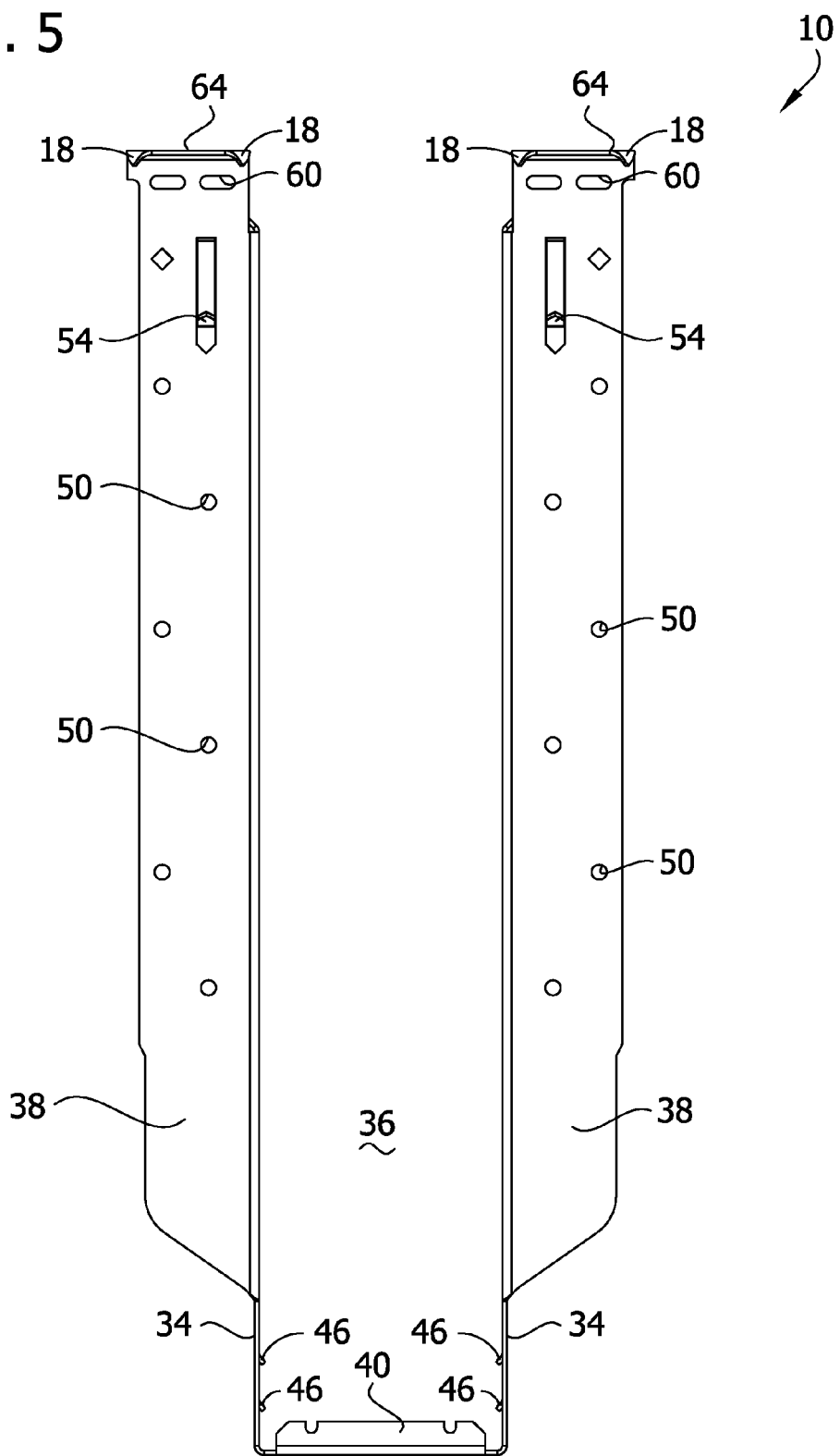
FIG. 5 is a rear elevation thereof.
Figure 6:
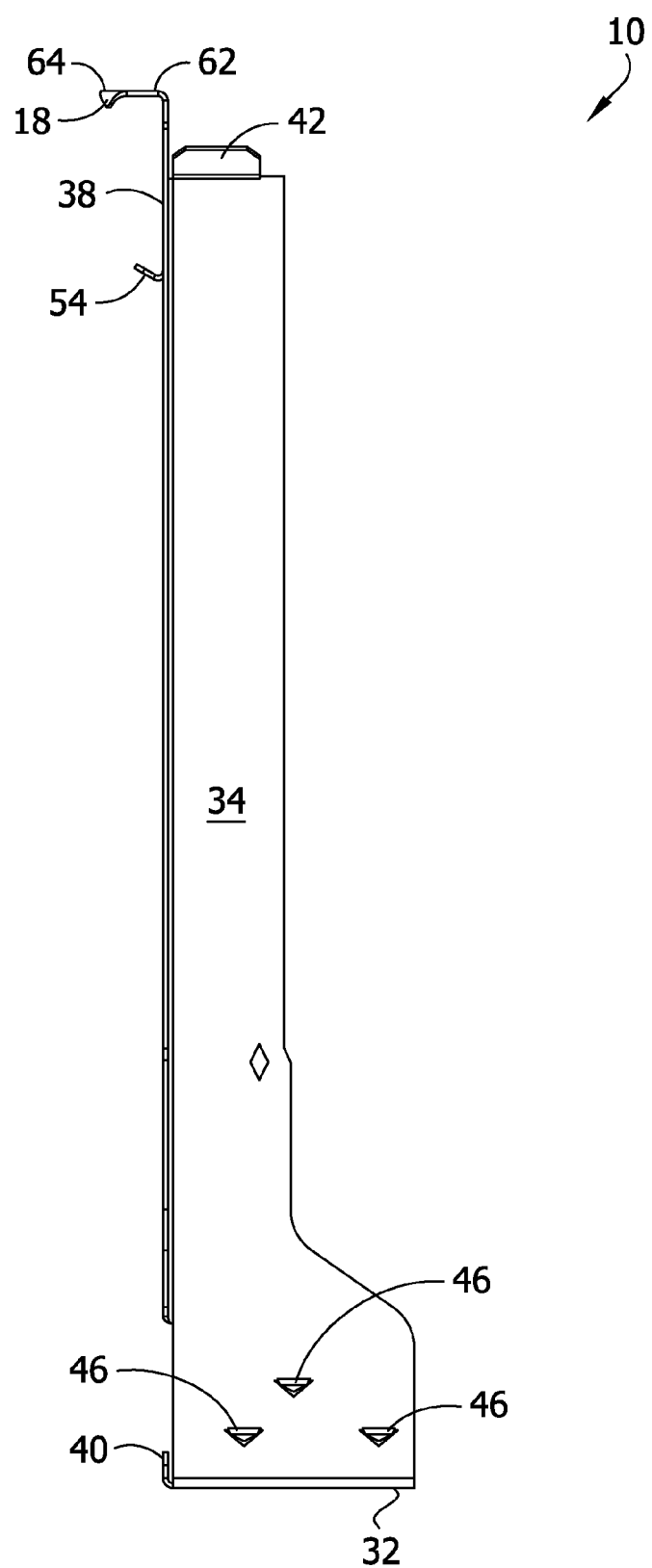
FIG. 6 is a left side elevation thereof.
Figure 7:
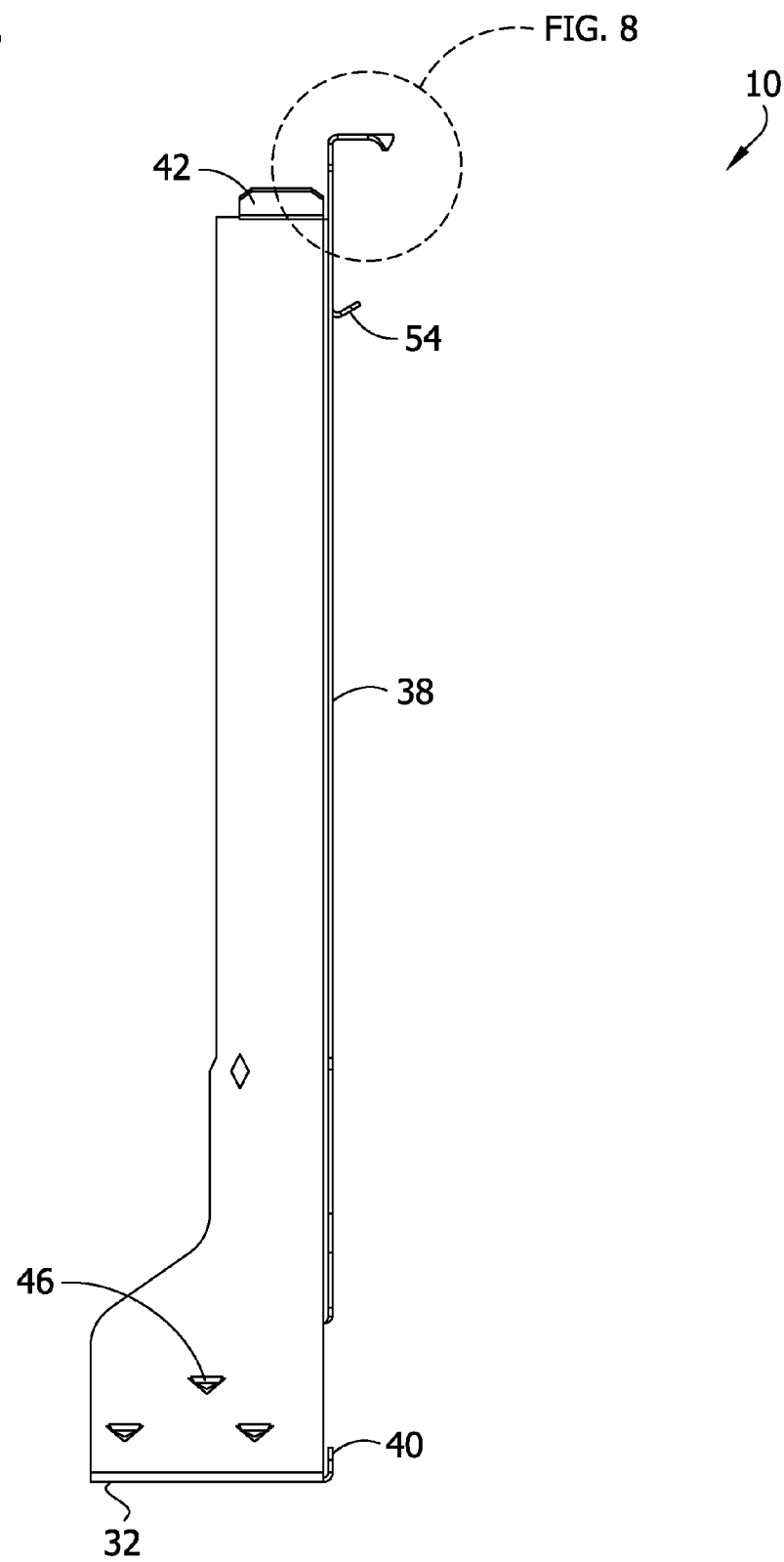
FIG. 7 is a right side elevation thereof.
Figure 8:
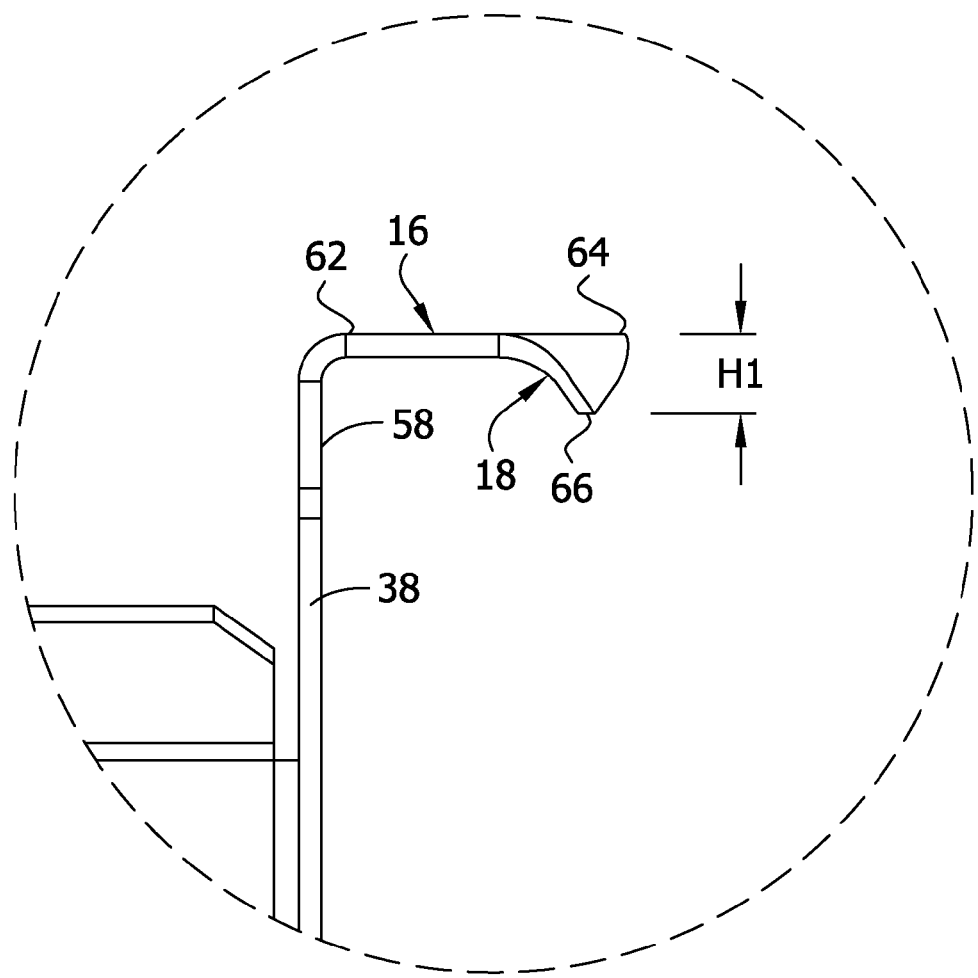
FIG. 8 is an enlarged fragmentary perspective of FIG. 7.
Figure 9:
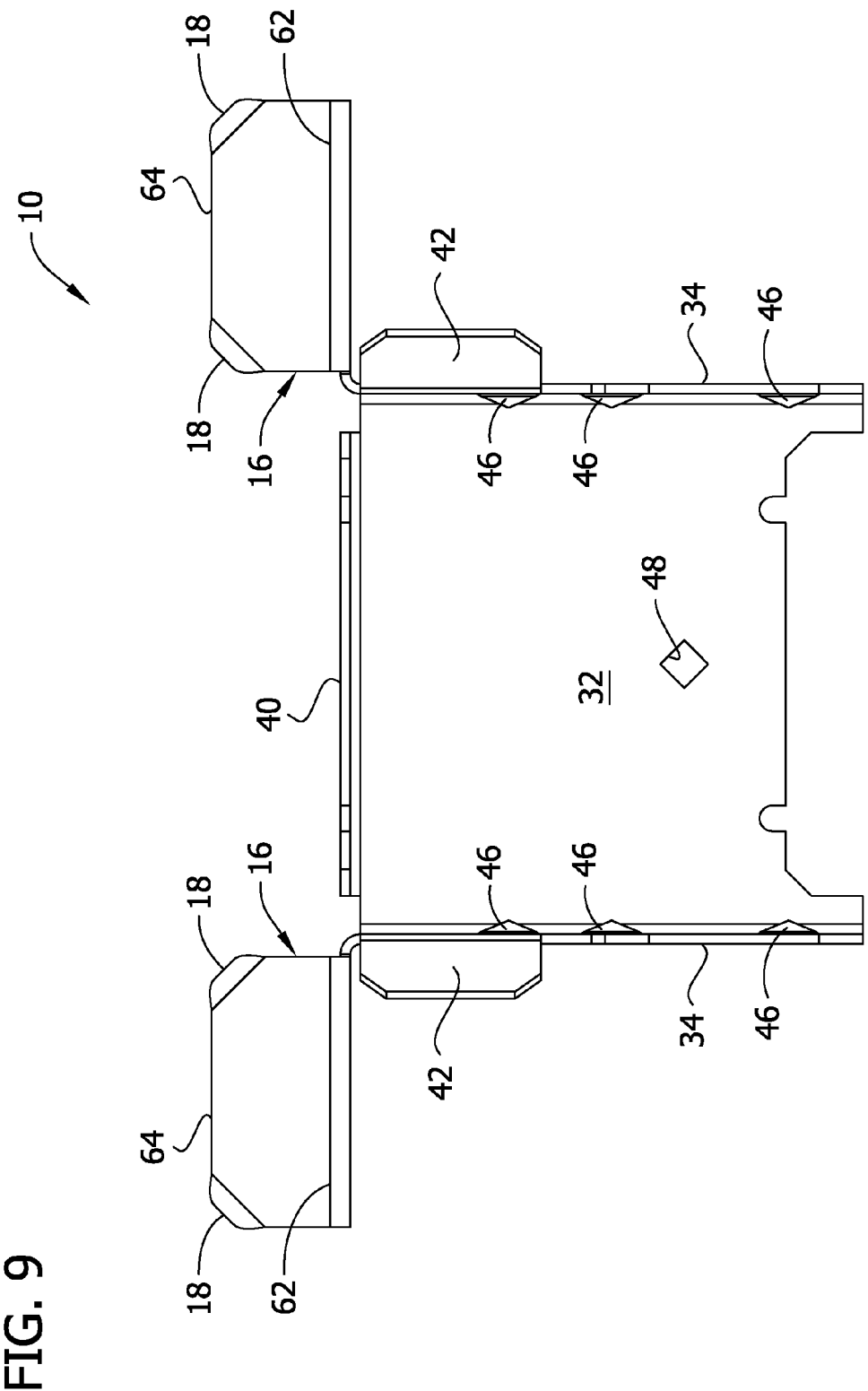
FIG. 9 is a top plan view of the hanger.
Figure 10:
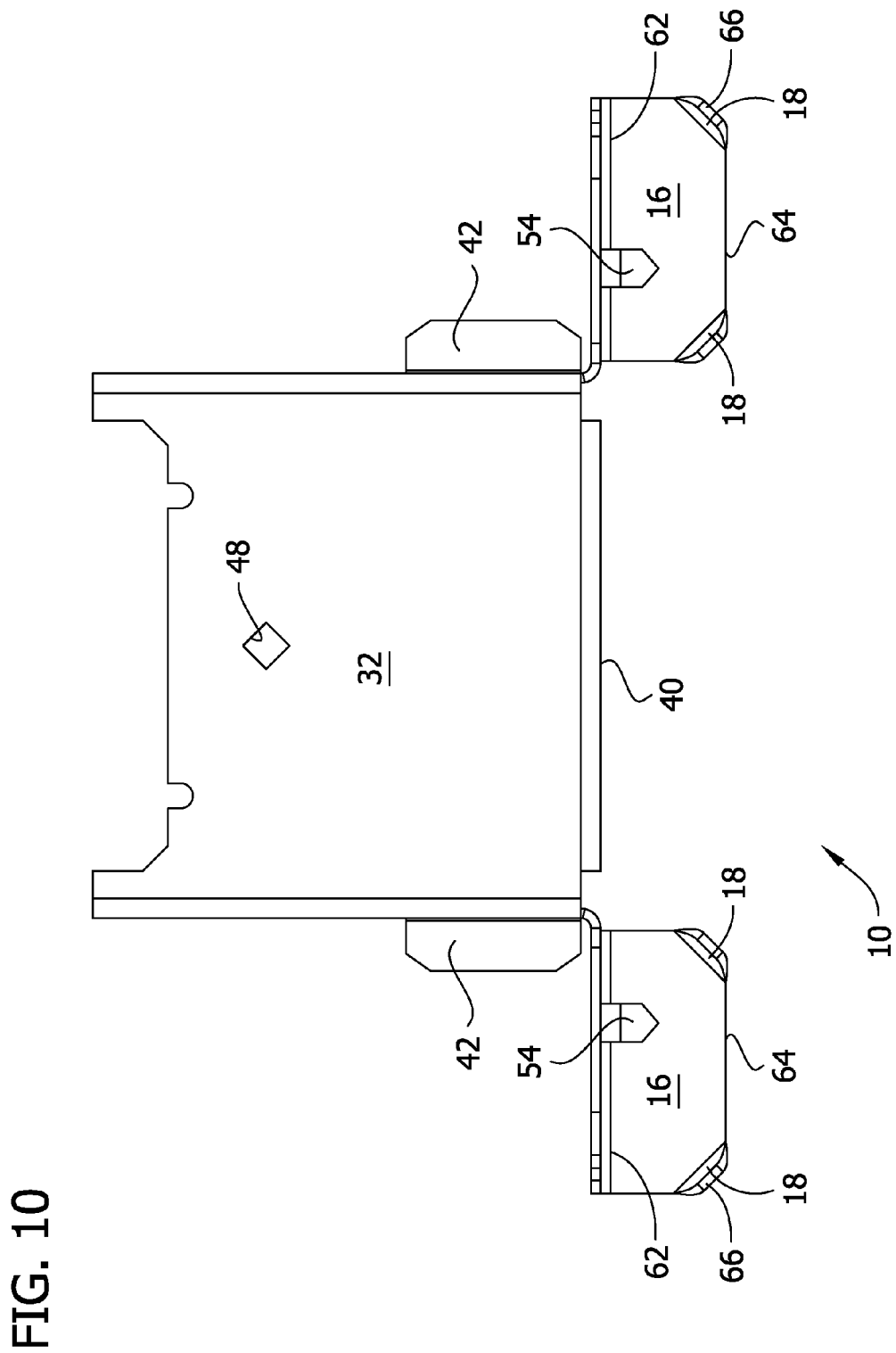
FIG. 10 is a bottom plan view thereof.

Referring to FIGS. 1 and 3, the joist 12 is received in the channel 36 to attach the joist to the header 14. The bottom chord 22 of the joist 12 engages and rests upon (i.e., is supported by) the base 32. The back panels 38 engage the front face 26 of the header 14. The top flanges 16 engage the top surface 28 of the header 14, as described in more detail below. The hanger 10 includes fastening structure for attaching the joist 12 to the hanger and for attaching the hanger to the header 14. Fastening structure can be of any type known in the art for attaching a connector to a wooden structural member, such as a hole to allow for insertion of a fastening member, or nailing teeth.

In the illustrated embodiment, the fastening structure for attaching the joist 12 to the hanger 10 comprises nailing teeth 46 struck from the material of the hanger 10. More specifically, the hanger 10 includes nailing teeth 46 struck from the side panels 34. The nailing teeth 46 are positioned on each of the side panels 34 so that they can be inserted into the bottom chord 22 of the joist 12 (i.e., the nailing teeth are located in a bottom portion of each side panel). The nailing teeth 46 are configured to engage a side face of the bottom chord 22 when the joist 12 is inserted into the hanger 10. The nailing teeth 46 resist upward movement of the joist 12 and retain the joist in the hanger 10. As illustrated, three nailing teeth 46 are struck from each side panel 34. The inclusion of three nailing teeth 46 eliminates the need for additional fastening structure for attaching the joist 12 to the hanger 10, although additional fastening structure can be included. For example, the side panels 34 can each also include nail holes or similar fastening structure to permit additional connections to the joist 12. The hanger 10 can also include fastening structure in the base 32 for additional connection to the bottom chord 22 of the joist 12. In the illustrated embodiment, the base 32 includes an opening 48 configured to receive a fastening member (e.g., a nail). It is understood that the hanger can include other fastening structure, or the fastening structure can be omitted within the scope of the present invention.

The fastening structure for attaching the hanger 10 to the header 14 comprises nail holes 50 in each back panel 38 to allow for insertion of nails 52. Each back panel 38 can also include a nail prong 54 struck from the back panel and configured to be driven into the front face 26 of the header 14. It is understood that the hanger can include other fastening structure within the scope of the present invention.

As seen in FIGS. 3-10, each back panel 38 includes a transition area 58 at the top of the back panel. This transition area 58 is wider than the remainder of the back panel 38. For example, in one embodiment, the transition area 58 is about ⅛ inch wider than the adjacent back panel portion. Each top flange 16 is contiguous with the transition area 58 of the respective back panel 38, and has a width substantially equal to a width of the transition area. Thus, the top flanges 16 are wider than a majority of the back panels 38. The back panels 38 include apertures 60 at or around the transition area 58 to facilitate easy folding of the top flanges 16 when forming the hanger 10 from a sheet metal blank. Each top flange 16 extends from a first end 62 contiguous with the transition area 58 of the back panel 38 to a free end 64 opposite the first end. Preferably, the top flange 16 is configured so that the free end 64 does not extend to a far edge of the top surface 28 of the header 14, as would be the case with top mount hangers or wrap around hangers. Instead, the free end 64 is configured to be positioned at an intermediate location on the top surface 28 of the header 14 (e.g., less than halfway across the depth of the header, as illustrated). In one embodiment, the top flange 16 has a depth measured from the intersection of the top flange and the back panel 38 to the free end 64 of the top flange of about ⅝ inch. Other configurations of the top flange are within the scope of the present invention.

As seen in FIGS. 3-10, each top flange 16 includes at least one locator tooth 18 configured to assist a user in positioning the hanger 10 on the header 14. In the illustrated embodiment, each top flange 16 includes a locator tooth 18 at each free corner of the top flange. Specifically, the corners of the top flange free end 64 (opposite the connection of the top flange 16 to the back panel 38) depend downward from respective adjacent portions of the top flange to form the locator teeth 18. Preferably, the corner margins of the free end 64 are bent downward to form the locator teeth 18. Each locator tooth 18 is generally triangular and includes a tip spaced farthest below the remainder of the top flange 16. The tip of each locator tooth 18 forms a sharp driving point or edge 66 configured to be driven into the header 14 when the hanger 10 is installed. The edge 66 extends generally perpendicular to the remainder of the top flange 16.

In one embodiment, the locator tooth 18 has a height H1 measured from the edge 66 to the top of the top flange 16 in a range of about 1/32 inch to about 5/16 inch, for example, about 3/16 inch. The edge 66 can be driven into the header by striking or tapping the locator tooth 18 with a hammer, a hand, or other blunt object. Thus, the locator tooth 18 is fixed for conjoint movement with the top flange 16 such that the top flange moves toward the top surface 28 of the header 14 as the locator tooth penetrates into the header. When the hanger 10 is initially located, the edge 66 is driven into the top surface 28 of the header 14, and the remainder of the top flange 16 engages (i.e., rests upon) the top surface of the header. Although each top flange 16 is illustrated with two locator teeth 18, other configurations are within the scope of the present invention. For example, each top flange can have any number of locator teeth, such as zero, one, or more than two.

Figure 11:
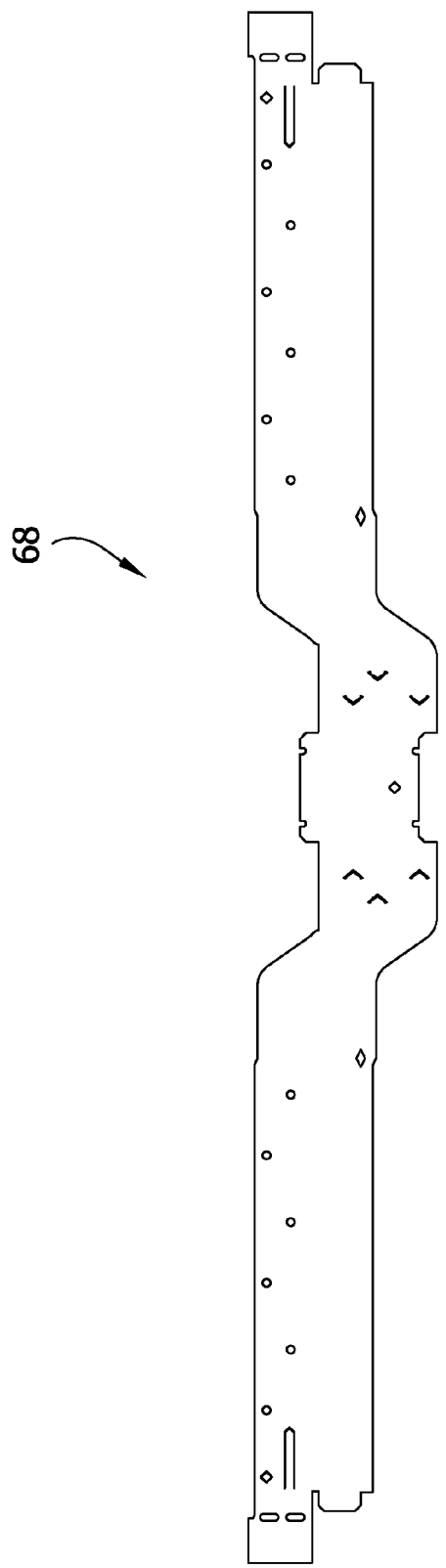
FIG. 11 is a top view of a stamped metal blank for forming a hanger according to the present invention.

As seen in FIG. 11, a hanger 10 as described above can be formed as one piece from a metal blank 68 that is stamped from a sheet metal roll and bent into shape. In one embodiment, the hanger 10 is stamped from 14-20 gauge steel (e.g., 18 gauge steel), although other suitable materials are within the scope of the present invention.

In use, the hanger 10 is positioned on the header 14 so that the top flanges 16 engage the top surface 28 of the header. Once the hanger 10 is placed in the desired position on the header 14, the locator teeth 18 are driven into the top surface 28 of the header 14, thereby assuring the hanger 10 remains in the desired position. The locator teeth 18 permit the hanger 10 to remain in the desired position until a user attaches the hanger to the header 14 with fastening structure as described above. When the hanger 10 is attached to the header 14 with only the locator teeth 18, the hanger can temporarily support the joist 12. Thus, the hanger 10 permits the user flexibility to attach the hanger to the header 14 either before or after positioning the joist 12 in the hanger. Furthermore, the side panels 34 of the hanger 10 are often flexed outwardly during shipping for packaging considerations. The locator teeth 18 permit the hanger 10 to retain the desired configuration for installation once the user has bent the hanger back into place (i.e., with the side panels 34 substantially vertical).

In one embodiment, after the locator teeth 18 are driven into the header 14, the back panels 38 of the hanger 10 are fastened to the front face 26 of the header, such as by inserting nails 52 through the nail holes 50. Optionally, if the hanger 10 includes nail prongs 54 as in the illustrated embodiment, the nail prongs are driven into the front face 26 of the header 14. Then, the joist 12 is inserted between the guide tabs 42 and into the channel 36 until the bottom chord 22 engages the base 32 of the hanger 10. The hanger 10 is fastened to the joist 12 by any suitable means, such as by the nail teeth 46 engaging the bottom chord 22 of the joist as the joist is inserted into the hanger. The hanger 10 is thus secured to both the joist 12 and the header 14, thereby mounting the joist on the header.

In another embodiment, the joist 12 is positioned in the hanger 10 before the hanger is fastened to the header 14. After the locator teeth 18 are driven into the header 14, if the hanger 10 includes nail prongs 54, the nail prongs are driven into the front face 26 of the header. Then, the joist 12 is inserted between the guide tabs 42 and into the channel 36 until the bottom chord 22 engages the base 32. The hanger 10 is fastened to the front face 26 of the header 14, such as by inserting nails 52 through the nail holes 50. The hanger 10 is fastened to the joist 12 by any suitable means, such as by the nail teeth 46 engaging the bottom chord 22 of the joist as the joist is inserted into the hanger. The hanger 10 is thus secured to both the joist 12 and the header 14, thereby mounting the joist on the header.

The hanger 10 facilitates quick and accurate alignment of a joist 12 on a header 14. The locator teeth 18 permit a user to position the hanger 10 in the desired position and have the hanger at least temporarily remain in the desired position until the hanger is fastened to the header 12 without requiring the user to hold the hanger in place. In addition, the locator teeth 18 permit a user to overcome bending of the side panels 34 (often applied for shipping) to position the hanger in the desired configuration with substantially vertical side panels.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A hanger for connecting a structural member to a structural support, the hanger comprising:
   a base sized and shaped for receiving the structural member thereon;
   first and second side panels extending upward from the base;
   first and second back panels, each of the back panels extending from a respective one of the side panels; and
   first and second top flanges, each of the top flanges extending from a respective one of the back panels and lying in a plane, each of the top flanges having a free end opposite the back panel, the free end having free corner margins defined by a rear edge and a side edge, at least one corner margin of at least one top flange depending downward from an adjacent portion of the top flange at a bend that is skewed with respect to both the rear edge and the side edge to form a locator tooth such that a portion of the rear edge is bent downwardly out of the plane of the top flange relative to a remainder of the rear edge, the locator tooth being configured to penetrate the structural support for at least temporarily locating the hanger on the structural support.

2. A hanger as set forth in claim 1, wherein at least one of the corner margins of each top flange depends downward from an adjacent portion of the top flange to form a locator tooth.

3. A hanger as set forth in claim 2, wherein all corner margins of each top flange depend downward to form locator teeth.

4. A hanger as set forth in claim 1, wherein the locator tooth is fixed for conjoint movement with the top flange such that the top flange moves toward the structural support as the locator tooth penetrates the structural support.

5. A hanger as set forth in claim 4, wherein the locator tooth bends downwardly out of plane with the top flange.

6. A hanger as set forth in claim 1, wherein the locator tooth includes a tip spaced farthest below the remainder of the top flange, the tip forming a sharp edge to facilitate penetrating the structural support.

7. A hanger as set forth in claim 1, wherein each locator tooth has a height in a range of about $1/32$ inch to about $5/16$ inch.

8. A hanger as set forth in claim 7, wherein each locator tooth has a height of about $3/16$ inch.

9. A hanger as set forth in claim 1, wherein each back panel comprises a transition area having a width greater than a remainder of the back panel, the respective top flange extending from the transition area.

10. A hanger as set forth in claim 9, wherein each top flange has a width substantially equal to the width of the transition area.

11. A hanger as set forth in claim 1, further comprising a stiffener tab extending upward from a rear edge margin of the base.

12. A hanger as set forth in claim 1, wherein each of the side panels further comprises nail teeth struck from the side panel and configured to engage the structural member.

13. A hanger as set forth in claim 1, wherein each top flange has a depth of about $5/8$ inch.

14. A hanger for connecting a structural member to a structural support, the hanger comprising:
    a base sized and shaped for receiving the structural member thereon;
    first and second side panels extending upward from the base, each of the side panels having nail teeth struck therefrom configured to engage the structural member;
    first and second back panels, each of the back panels extending from a respective one of the side panels and including a major surface arranged to engage the structural support, each back panel having fastening structure configured to permit attachment of the back panel to the structural support; and
    first and second top flanges, each of the top flanges extending from a respective one of the back panels and lying in a plane, each of the top flanges having a free end opposite the back panel, the free end having free corner margins defined by a rear edge and a side edge, at least one corner margin of each top flange being bent downward from an adjacent portion of the top flange at a bend that is skewed with respect to both the rear edge and the side edge to form a locator tooth such that a portion of the rear edge is bent downwardly out of the plane of the top flange relative to a remainder of the rear edge, the locator tooth being configured to penetrate the structural support for at least temporarily locating the hanger on the structural support.

15. A hanger as set forth in claim 14, wherein all corner margins of each top flange are bent downward from an adjacent portion of the top flange to form a locator tooth.

16. A hanger as set forth in claim 14, wherein the locator tooth is fixed for conjoint movement with the top flange such that the top flange moves toward the structural support as the locator tooth penetrates the structural support.

17. A hanger as set forth in claim 16, wherein the locator tooth bends downwardly out of plane with the top flange.

18. A hanger as set forth in claim 1, wherein the locator tooth includes a tip spaced farthest below the remainder of the top flange, the tip forming a sharp edge to facilitate penetrating the structural support.

19. A hanger as set forth in claim 14, wherein each locator tooth has a height in a range of about 1/32 inch to about 5/16 inch.

20. A hanger as set forth in claim 19, wherein each locator tooth has a height of about 3/16 inch.

* * * * *